US012755171B2

(12) United States Patent
Bhatia et al.

(10) Patent No.: US 12,755,171 B2
(45) Date of Patent: Oct. 6, 2026

(54) EFFICIENT GENERATION OF AN EXTRAPOLATED INFERENCE ASSOCIATED WITH A SUBSEQUENT EVENT WITH INCREASED FIDELITY AND REDUCED REDUNDANCY

(71) Applicant: Truist Bank, Charlotte, NC (US)

(72) Inventors: Jasmeet Singh Bhatia, Glen Allen, VA (US); Daria Hadalski, Fayetteville, GA (US); Dennis W. Yerby, Richmond, VA (US); Peter J. Opachan, Summerfield, NC (US); Joseph Lynn Thompson, Clayton, NC (US)

(73) Assignee: TRUIST BANK, Charlotte, NC (US)

( * ) Notice: Subject to any disclaimer, the term of this patent is extended or adjusted under 35 U.S.C. 154(b) by 790 days.

(21) Appl. No.: 18/064,720

(22) Filed: Dec. 12, 2022

(65) Prior Publication Data

US 2024/0193442 A1 Jun. 13, 2024

(51) Int. Cl.
*G06N 5/04* (2023.01)

(52) U.S. Cl.
CPC .................................... *G06N 5/04* (2013.01)

(58) Field of Classification Search
CPC ...................................................... G06N 5/04
See application file for complete search history.

(56) References Cited

U.S. PATENT DOCUMENTS 7,720,782 B2 * 5/2010 Chaudhury ............ G06N 20/00 706/46
2004/0240578 A1 12/2004 Thesling
2005/0125474 A1 6/2005 Pednault
2019/0340684 A1 * 11/2019 Belanger .................. G06N 3/08
2021/0000442 A1 1/2021 Marshall
2021/0132759 A1 5/2021 Ignatyev
2023/0162056 A1 5/2023 Poole
2023/0186213 A1 * 6/2023 Tr ............................ G06N 5/01 705/7.28
2023/0394326 A1 * 12/2023 Han ....................... G06N 20/10
2024/0119417 A1 4/2024 Sorensen

FOREIGN PATENT DOCUMENTS

EP 1708414 A1 * 10/2006 ........... H04L 41/147
KR 20090001939 A 1/2009

* cited by examiner

*Primary Examiner* — Asher D Kells

(74) *Attorney, Agent, or Firm* — Michael A. Springs, Esq.; Shumaker, Loop & Kendrick, LLP; Patrick B. Horne

(57) ABSTRACT

A method for generating an extrapolated indication includes receiving input data associated with a subsequent event and indicating a determined variable for the subsequent event. The determined variable is strongly correlated with indications of previous events and is identified utilizing bivariate analysis and data brackets correlated with the indications of the previous events, as identified using a multiple variable algorithm and the previous events. The method also includes generating the extrapolated indication associated with the subsequent event utilizing the input data, the determined variable, and an associated determined value, which separates ranges of data associated with the determined variable, which is strongly correlated with indications of the previous events and is generated utilizing bivariate analysis and the data brackets. The extrapolated indication has increased fidelity or reduced redundancy relative to an extrapolated indication generated from input data not indicating the determined variable for the subsequent event.

20 Claims, 4 Drawing Sheets

EFFICIENT GENERATION OF AN EXTRAPOLATED INFERENCE ASSOCIATED WITH A SUBSEQUENT EVENT WITH INCREASED FIDELITY AND REDUCED REDUNDANCY

FIELD

This invention relates generally to the field modeling subsequent events based on preceding events, and more particularly embodiments of the invention relate to a program for determining parameters utilized to extrapolate an indication of a subsequent event.

BACKGROUND

Models, algorithms, and the like can generally be used to predict a subsequent outcome based on previous events. For instance, data representing or associated with various previous events (e.g., events already taken place) may indicate or be used to determine parameters utilized by the model to determine a characteristic with respect to a subsequent outcome. The parameters utilized to generate a characteristic with respect to the subsequent outcome or an inference may themselves be determined from model data including a large number of parameters, values, and the like associated with previous events, such a large number of previous events. In many situations, a larger amount of data relevant to the previous events may produce modeling parameters that increase the accuracy of an inference with respect to a subsequent outcome. It is often unknown which values and represented parameters within a large amount of model data are relevant or most relevant to determining a characteristic of the subsequent outcome.

Generally, additional model data provided to determine parameters is associated with increased processing time, greater computing power consumption, and/or a reduction in available processing power for executing other computer-readable instructions. Improvement in the processing time and required processing power can typically be realized by reducing the model data utilized to determine the variables. However, a reduction in the quantity of the model input data used to determine the parameters can reduce the accuracy of any characteristic determined with respect to the subsequent outcome.

In view of the circumstances described above, there is a need for a system to determine parameters for use in modeling subsequent events that increases the fidelity of inferences with respect to the subsequent events, reduces redundancy, and/or realizes increased efficiency.

BRIEF SUMMARY

Embodiments of the present invention address the above needs and/or achieve other advantages by providing systems, apparatuses, and methods that identify and/or generate a determined variable and an associated determined value from input data representative of previous events. The determined variable and the associated determined value may generally be suitable for generating an extrapolated indication associated with a subsequent event. A multiple variable statistical algorithm or logistic regression may be utilized to identify data brackets or variables that are correlated with the indications of the previous events. Thereafter, bivariate analysis or decision tree analysis may be utilized to identify the determined variable, which defines a strong interpolated correlation with indications of the previous events. In several embodiments bivariate analysis or decision tree analysis may further be utilized to generate the determined value associated with the determined value, which separates ranges of data associated with the determined variable based the strong interpolated correlation. Utilization of the determined value of the determined variable to generate an inference or an extrapolated indication associated with the subsequent event rather than data not indicating the determined variable for the subsequent event increases the fidelity of the extrapolated indication, reduces redundancy within the extrapolated indication, realizes increased efficiency, or a combination of the preceding. For example, systems, apparatuses, and methods disclosed herein may also or alternatively be directed to generating the extrapolated indication from the data associated with the subsequent event, the determined variable identified from the data of previous events, and the determined value of the determined variable generated from the data of previous events Aspects of the present subject matter are directed to a method for generating an extrapolated indication associated with a subsequent event. The method includes receiving, at a computing station, a representation of one or more determined variable and a determined value for each determined variable. The determined variable(s) is strongly correlated with indications of two or more previous events and is identified utilizing bivariate analysis and two or more data brackets. Each data bracket of the data brackets is correlated with indications of the previous events and identified utilizing a multiple variable algorithm and determination data indicative of the previous events associated with two or more users. The determined value for each determined variable separates ranges of data of the associated determined variable, which is strongly correlated with indications of the previous events within the determination data and is generating utilizing bivariate analysis and the plurality of brackets. The method further includes receiving, at the computing station, input data including data associated with the subsequent event and indicative of the determined variable(s) for the subsequent event. The method also include generating the extrapolated indication associated with the subsequent event utilizing the input data, the determined variable(s), and the determined value for each determined variable of the determined variable(s). Furthermore, generating the extrapolated indication associated with the subsequent event utilizing the determined variable(s) and each associated determined value increases fidelity of the extrapolated indication associated with the subsequent event, reduces redundancy within the extrapolated indication, or both. Whereas, generating an extrapolated indication associated with the subsequent event utilizing input data of a data bracket not indicating the determined variable(s) for the subsequent event increases infidelity in the extrapolated indication, results in an extrapolated indication including excessive redundancy, or both.

In at least one embodiment, logistic regression may be utilized to identify the data brackets, each correlated with indications of the previous events.

In an additional or alternative aspect, the present subject matter is directed a method for generating an extrapolated indication associated with a subsequent event. The method include receiving, at a computing station, input data including data associated with the subsequent event and indicative of one or more determined variables for the subsequent event. The determined variable(s) is strongly correlated with indications of a two or more of previous events and is identified utilizing bivariate analysis and two or more data brackets, each data bracket of the data brackets is correlated with indications of the previous events and identified utilizing a multiple variable statistical algorithm and determination data indicative of the previous events associated with two or more users. The method further includes generating the extrapolated indication associated with the subsequent event utilizing the input data, the determined variable(s), and a determined value for each determined variable of the determined variable(s). The determined value for each determined variable separates ranges of data of the associated determined variable, which is strongly correlated with indications of the previous events within the determination data. The determined value for each determined variable is generating utilizing bivariate analysis and the plurality of brackets. Furthermore, generating the extrapolated indication associated with the subsequent event utilizing the determined variable(s) and each associated determined value increases fidelity of the extrapolated indication associated with the subsequent event, reduces redundancy within the extrapolated indication, or both. Whereas, generating an extrapolated indication associated with the subsequent event utilizing input data of a data bracket not indicating the determined variable(s) for the subsequent event increases infidelity in the extrapolated indication, results in an extrapolated indication including excessive redundancy, or both.

In at least one embodiment, the method may include receiving, at the computing station, a determination file including a representation of the determined variable(s) and each associated determined value. In some such embodiments and/or in alternative embodiments, the method may further include communicating, utilizing the computing station, a representation of the extrapolated indication association with the subsequent event. Additionally or alternatively, logistic regression may be utilized to identify the data brackets each correlated with indications of the previous events.

Additionally or alternatively, decision tree analysis may be utilized to generate the determined value for each of the determined variable(s) that separates ranges of data associated with the determined variable(s). In some embodiments, the determined value for each of the determined variable(s) may define a first range of values of data of the associated determined variable indicative of a first level of completion of the previous events and a second range of values of data of the associated determined variable indicative of a second level of completion of the previous events. In alternative or further embodiments, generating the extrapolated indication associated with the subsequent event may further utilize a second determined value of the determined variable(s). In such embodiments, the second determined value may separates ranges of data associated with the determined variable(s) based on the strong internal correlation within the determination data. Additionally or alternatively, the second determined value and the determined value of an associated determined variable may define a first range, second range, and a third range of values of data of the associated determined variable. The first range of values of data may be indicative of a first level of completion of the previous events, and the second range of values of data may indicative of a second level of completion of the previous events. Similarly, the third range of values of data may be indicative of a third level of completion of the previous events. In an additional or alternative embodiment, generating the extrapolated indication associated with the subsequent event may further utilize a second determined value for each determined variable of the determined variable(s). Furthermore, each second determined value and the associated determined value may define two ranges of data of the associated determined variable based on the strong internal correlation within the determination data.

In some further or alternative embodiments, decision tree analysis may be utilized to identify the determined variable(s) strongly correlated with indications of the previous events. In some further or alternative embodiments, the determined variable(s) may include a first determined variable that defines a first strong internal correlation with indications of the previous events and a second determined variable that defines a second strong internal correlation with indications of the previous events. Additionally or alternatively, decision tree analysis may be utilized to identify the first determined variable that defines the first strong internal correlation with indications of the previous events. In an additional or alternative embodiment, decision tree analysis may be utilized to identify the second determined variable that defines the second strong internal correlation with indications of the previous events. In some instances, the first determined variable may be indicative of a debt coverage ratio of the users associated with the previous events, and the second determined variable may be indicative of at least one of a cash flow velocity or a percentile change in a deposited balance of the users associated with the previous events. Additionally or alternatively, the determined variable(s) may further include a third determined variable that defines a third strong internal correlation with indications of the previous events. In some embodiments, decision tree analysis may be utilized to identify the third determined variable that defines the third strong internal correlation with indications of the previous events.

In some embodiments, the determined variable(s) may be indicative of a debt coverage ratio of the users associated with the previous events. Additionally or alternatively, the first determined variable may be indicative of a debt coverage ratio of the users associated with the previous events, and the second determined variable may be indicative of a cash flow velocity or a percentile change in a deposited balance of the users associated with the previous events.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
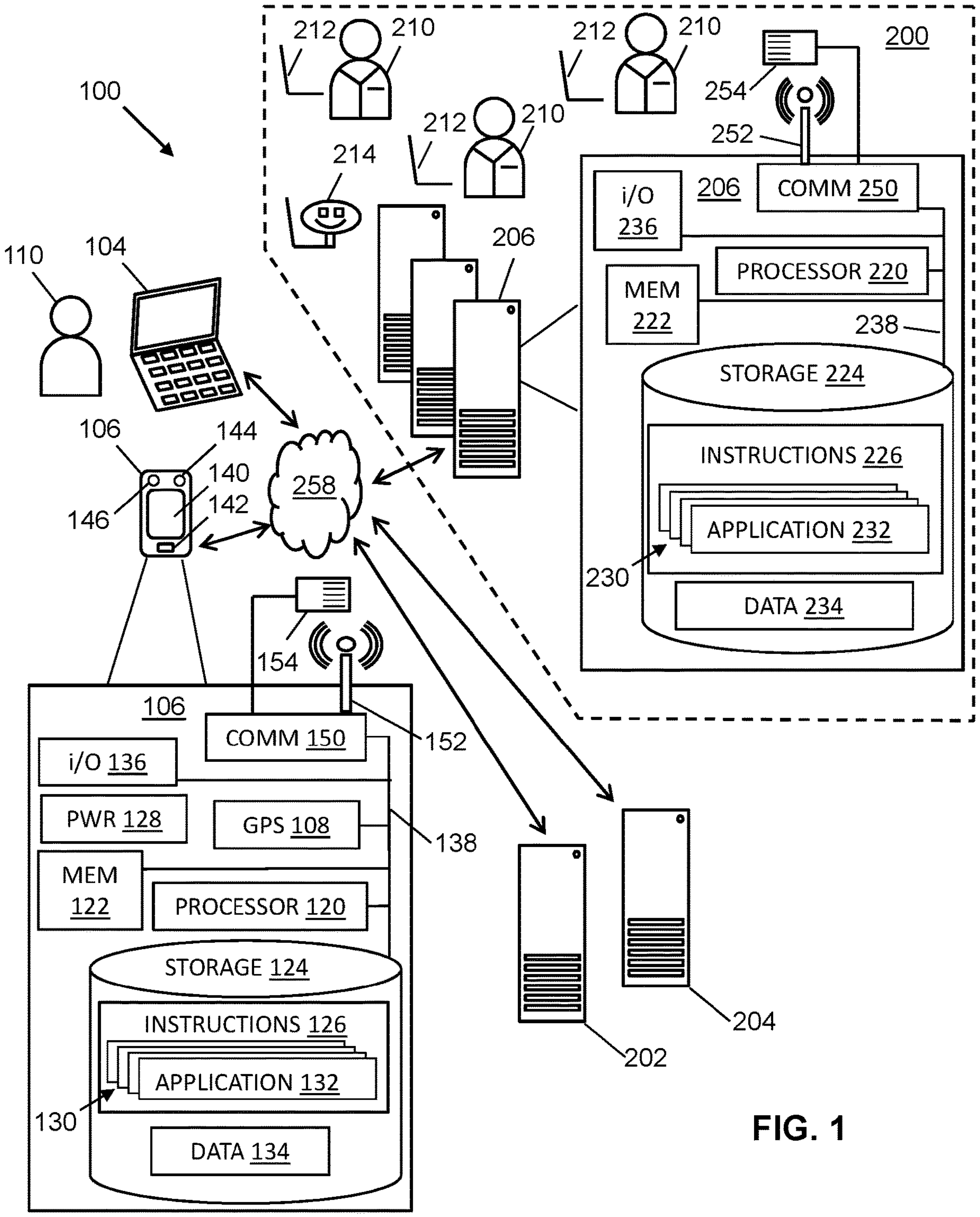

Having thus described embodiments of the invention in general terms, reference will now be made to the accompanying drawings, wherein:

FIG. 1 illustrates an enterprise system, and environment thereof, according to at least one embodiment.

Figure 2:
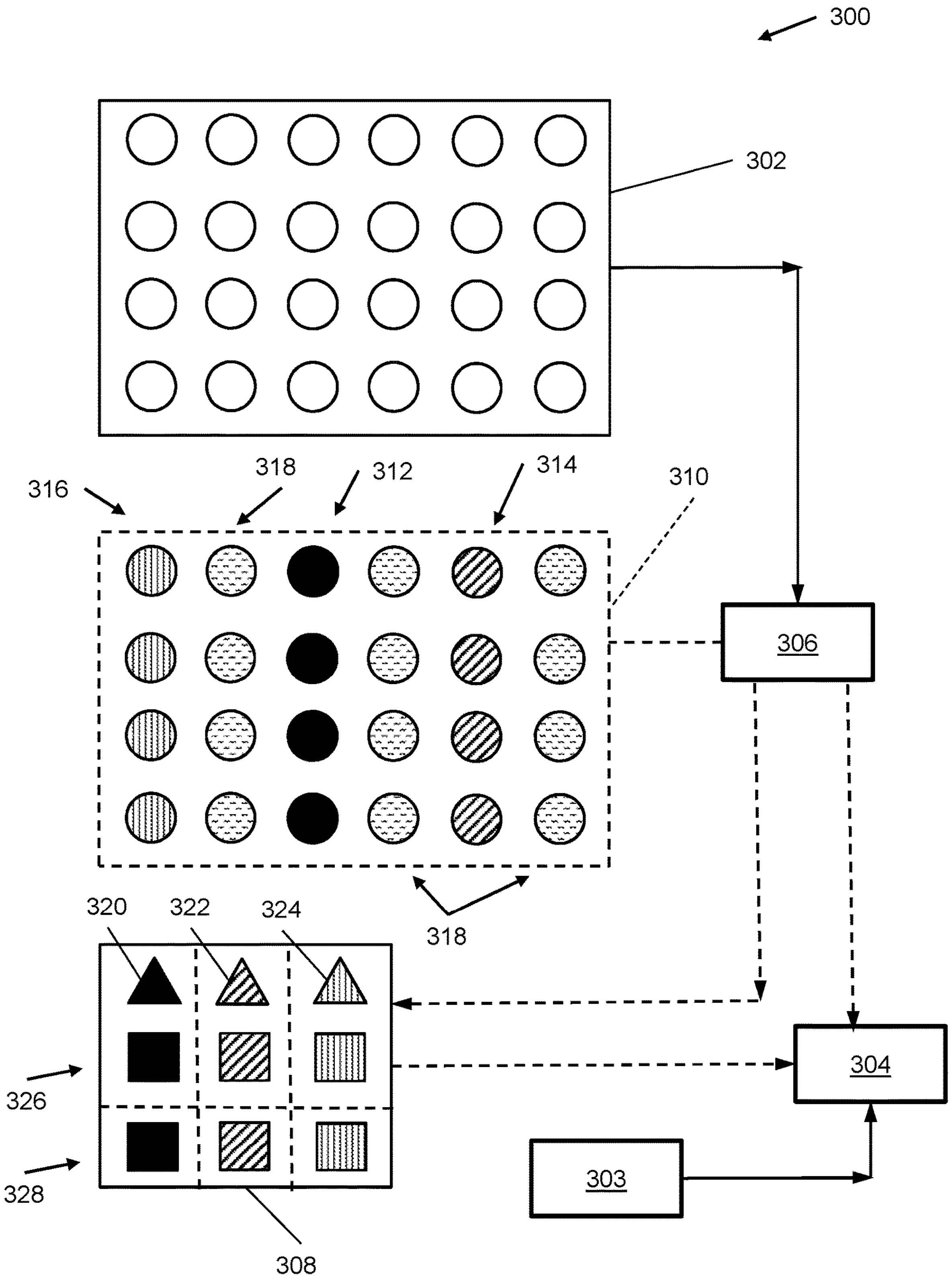

FIG. 2 is a schematic logic diagram of a system for identifying a determined variable and generating a determined value from the data of previous events, according to at least one embodiment.

Figure 3:
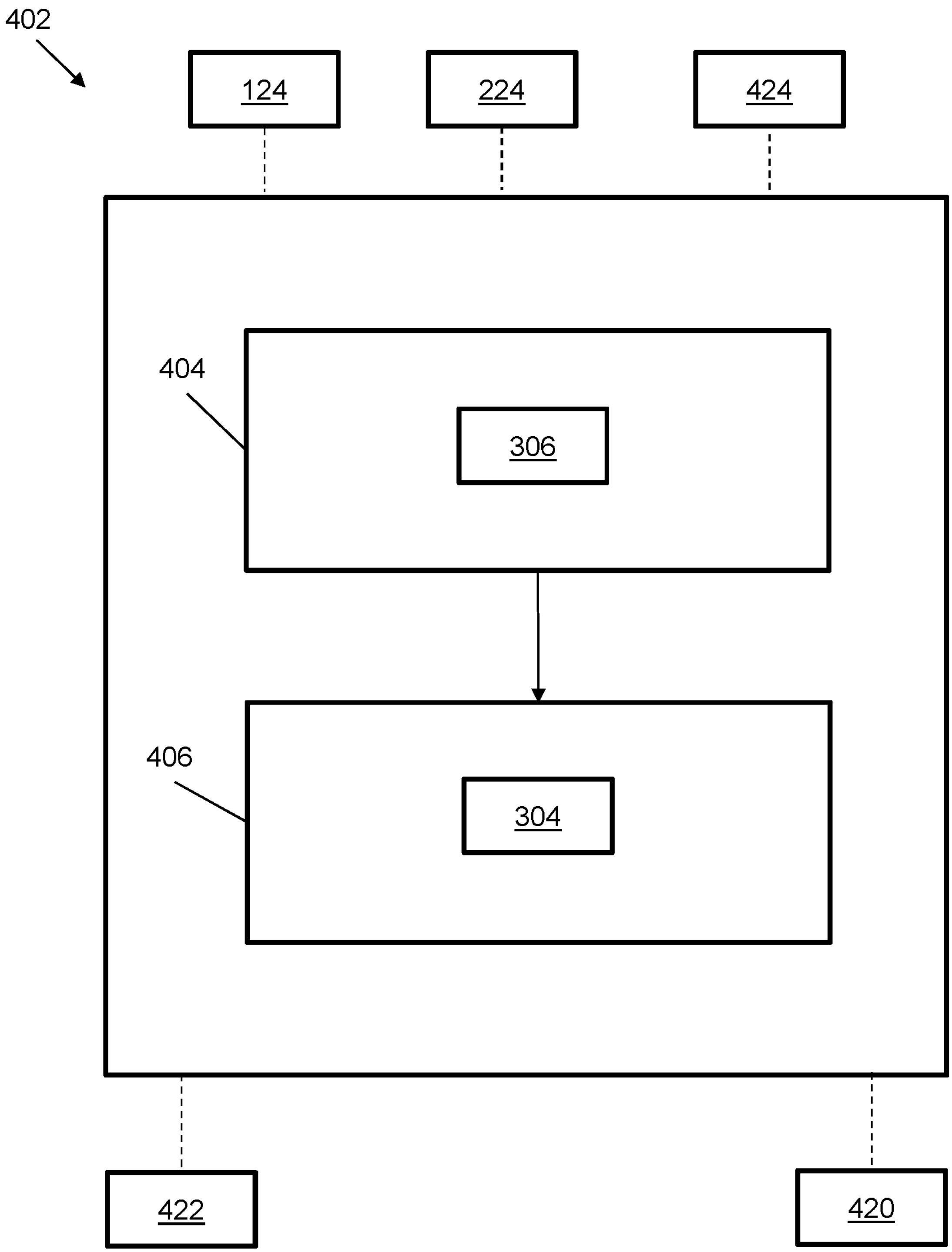

FIG. 3 is a schematic logic diagram of a system including a front-end program for identifying the determined variable and determined value and a back-end program for generating an extrapolated indication from the determined variable, the determined value, and input data associated with a subsequent event.

Figure 4:
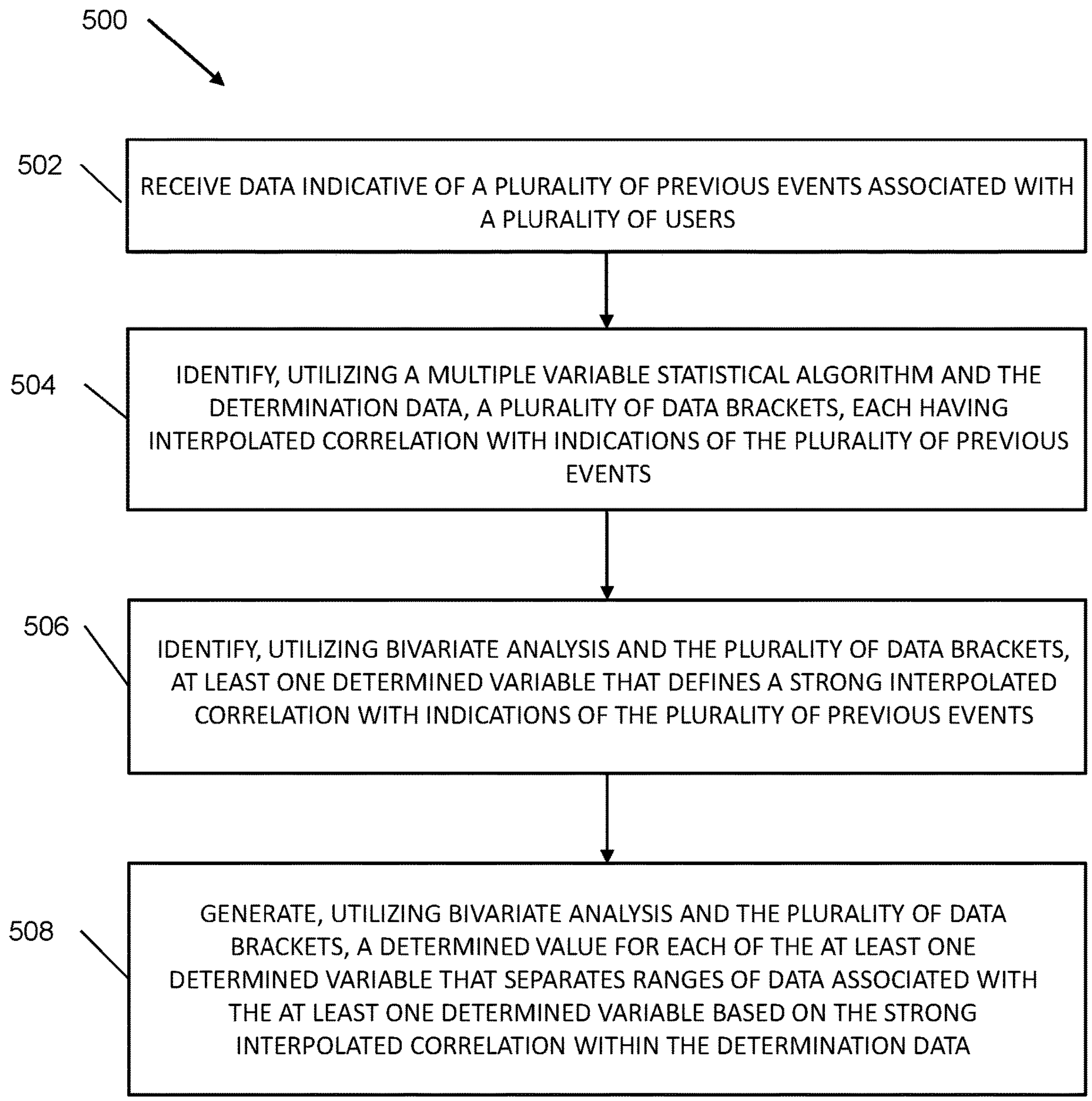

FIG. 4 is a flow chart representing a method, according to at least one embodiment, for generating a determined variable and associated value suitable for generating an extrapolated indication associated with a subsequent event.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence engine (e.g., an artificial intelligence system, artificial intelligence algorithm, artificial intelligence module, program, and the like) generally refer to computer implemented programs that are suitable to simulate intelligent behavior (i.e., intelligent human behavior) and/or computer systems and associated programs suitable to perform tasks that typically and/or historically require a human to perform, such as tasks requiring visual perception, speech recognition, decision-making, translation, and the like. An artificial intelligence engine, program, module, etc. may include, for example, at least one of a series of associated if-then logic statements, a statistical model suitable to map raw sensory data into symbolic categories and the like, logical regression, decision tree algorithms, a machine learning program, or the like.

Artificial intelligence and elements thereof may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program may generally be configured to perform methods and functions as described or implied herein, for example by one or more corresponding flow charts expressly provided or implied as would be understood by one of ordinary skill in the art to which the subjects matters of these descriptions pertain. Thus and in various additional and alternative configurations of the AI program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine.

It should be appreciated that the AI program may include variations, adaptations, and alternatives suitable to perform the operations necessary for the system, and the present disclosure is equally applicable to such suitably configured artificial intelligence programs, modules, etc. For instance, the machine learning program may include one or more AI tools, subroutines, programs, subprograms, etc. (e.g., Logistic Regression (LR), Naive-Bayes, Random Forest (RF), matrix factorization, and support vector machines).

With reference to the general architecture, features, and function of AI engines as described above, such as multiple variable statistical algorithms, logistic regression, bivariate analysis, decision tree analysis and other AI algorithms, the present subject matter is also directed to applications in which an input file for utilization to generate an indication (e.g., an inference, an inference with respect to a subsequent event, or the like) results in infidelity, unnecessary or undesirable redundancy, and/or increased computational time required to generate the indication. As an example, the input file may contain data unrelated to improving an accuracy of the indication generated with respect to a subsequent event. Some input files may further or alternatively include data redundant for purposes of improving the fidelity of the output data (e.g., the indication). As used herein, the terms "user" and "entity" describe at least two parties in the context of certain example past events, such as commercial interactions between the entity and one user or multiple users, and the generation of predictions with reference to a characteristic of a subsequent event, such as probabilities that a subsequent event or type event may occur. However, it is to be understood that the example of a user and an entity are merely illustrative, and that the techniques of the present disclosure are applicable to all manner of input data processing utilizing AI techniques, as used herein.

In an exemplary embodiment and as illustrated schematically with reference to FIG. 2, a system 300 is generally suitable to identify and/or generate a determined variable and an associated determined value from input data representative of, indicative of, and/or associated with two or more previous events (e.g., determination data 302). The determined variable and the associated determined value may generally be suitable for generating an extrapolated indication associated with a subsequent event. For example, an associated indication program 304 may be configured to utilize relationships, correlations, etc. determined between data representative of previous events and known indications or outcomes of such previous events to produce the extrapolated indication associated with the subsequent event e.g., an inference or a prediction associated with a subsequent event. For example, the indication program 304 may generate the extrapolated indication associated with the subsequent event from input data 303 representative of, indicative of, or associated with one or more users associated with the subsequent event.

Generally the system 300 may include or be configured to implement a determination program 306 with steps suitable to identify one or more determined variables, each of which defines a strong interpolated correlation with indications of two or more previous events. Thus, and as shown, the determination program 306 is communicatively coupled to the determination data 302 indicative of (e.g., associated with) the previous events and/or the indications associated with the respective previous events. The determination program 306 may further generate or produce, for each determined variable, a determined value that separates values of data associated with the respective determined variable. As explained in more detail below, embodiments of methods associated with the system 300 and/or determination program 306 disclosed herein may include computer readable instructions suitable to identify the determined variable(s) and to generate the respective determined value(s).

In various embodiments, the system 300, determination program 306, and/or indication program 304 may include one or more subprograms and/or be associated with instructions allowing the determination program 306 to communicate with the determination data 302, the indication program 304, and/or a determination output file (e.g., determined output 308). In some embodiments the determination program 306 may be associated with instructions to produce or generate the determined output 308. The indication program 304 may similarly include one or more subprograms and/or be associated with instructions allowing for communication with input data 303 or the determined output 308. For instance, system 300, the determination program 306, and/or indication program 304 may include one or more drivers suitable or capable of interfacing with the applications and/or storage format of the determination data 302, the input data 303 representative of the subsequent event, and/or the determined output 308 in order to receive the respective data. In some embodiments, the system 300 and/or indication program 304 may include one or more subprograms or drivers and/or be associated with instructions allowing for an operator of the system 300 and/or indication program 304 to manually enter the determined variable(s) and associated determined value(s) for generating the extrapolated indication associated with a subsequent event or store such determined variable(s) and/or determined values(s) for the generation of multiple extrapolated indications associated with multiple, respective subsequent events.

In some embodiments, the subsequent event may include or be related to one or more of a loan, lease, mortgage, or structured payment plan. Additionally or alternatively, the extrapolated indication may represent a predicted quality, outcome, or result associated with such events. In some embodiments, the extrapolated indication may be associated with a predicted quality, outcome, or result associated with one or more installments on a loan, lease, mortgage, or structured payment plan, e.g., an installment, payment, or the like of a user associated with the subsequent event. In some embodiments, the subsequent event may be associated with two or more users, and the input data 303 may include data associated with one or more, such as each of such users.

Additionally or alternatively, the determination program 306 may include or be configured to implement an AI program, or the like, as described herein capable of determining variables indicated by the determination data 302 having interpolated correlations with the indications of the previous events, identifying the determined variable(s) defining strong interpolated correlation(s) with indications of the previous events, and/or generating determined values associated with the determined variables that separate ranges of the data associated with the determined variables based on the strong interpolated correlations. For example, the AI program may be configured utilize multiple variable statistical algorithms, logistic regression, bivariate analysis, decision tree analysis, and/or other AI algorithms as described herein.

In some embodiments, at least a portion of determination program 306 may be implemented on the processing device 120, the processing device 220, and/or one or more dedicated processing device or processing devices associated with the system 300. In various embodiments, instructions associated with the determination program 306 may be stored in an associated memory device and/or storage device of the system (e.g., memory device 124 and/or memory device 224) communicatively coupled to the associated processor(s). Additionally or alternatively, the system 300 may include one or more memory devices and/or storage devices for processing use and/or including one or more instructions necessary for operation of the determination program 306.

In some embodiments, the determination data 302 includes data indicative of (e.g., associated with, related to, or the like) two or more of a loan, lease, mortgage, or structured payment plan. Generally, the determination data 302 may include data indicative of numerous previous events, such one hundred previous events or more, such one thousand previous events or more. In various embodiments, determination data 302 may be representative of previous events within a set time period. For example, the determination data 302 may include data indicative of previous events in a six-month period, such as a three-month period, such a period preceding or immediately preceding utilization of the indication program 304.

Generally, each previous event may be associated with one or more users, such as two or more users. In some embodiments, each indication included in or associated with the determination data 302 may include, for example, a known quality, a known outcome, or known result associated with a previous event. However, it should be appreciated that the determination data 302 may include data indicative of one or more previous events with an unknown or partially known indication. For example, some previous events may be still in process, e.g., a concurrent event, and include no indication or a portion of the future total number of indications associated with the respective, concurrent event. In some embodiments, one or more indications, such a multiple indications, such as each indication, included in or associated with the determination data 302 may be indicative of a known quality, outcome, or result associated with one or more installments on a loan, lease, mortgage, or structured payment plan, e.g., an installment, payment, or the like, of the user(s) associated with the respective previous event(s).

Generally, input data 302 for use by the associated indication program 304 often includes data that is irrelevant or has negligible value for determining an accurate or acceptable output (e.g., the indication associated with the subsequent event). Thus, an extrapolated indication associated with the subsequent event generated utilizing all of the data or the wrong portions of the data of the input data 303 (e.g., data of the user associated with the subsequent event not representative or indicative of determined variable) is generally associated with infidelity in the associated extrapolated indication, unnecessary or undesirable redundancy, increased computational time, or any combination of the preceding.

Thus, embodiments of system 300 may reduce processing requirements for the associated indication program 304 to generate or produce an accurate extrapolated indication associated with the subsequent event, e.g., an inference output. The extrapolated indication may include an assessment of whether the subsequent event and/or that the respective user will be associated with particular qualities including, but not limited to, the user defaulting on an obligation associated with the subsequent event, the user missing a payment or installment associated with the subsequent event, the user successfully making a payment or installment associated with the subsequent event, and/or the user successfully making a final payment or installment associated with the subsequent event.

Thus, the system 300 or components thereof (such as the determination program 306) are able to reduce the amount of data requiring processing and/or consideration to determine desirable variables and/or parameters utilized for modeling, for statically analysis, and/or to produce an inference or predicted outcome with respect to the subsequent event, e.g., the extrapolated indication of the subsequent event produced by the indication program 304. Furthermore, embodiments of the system 300 or components thereof (such as the determination program 306) may identify variables particularly suitable for modeling, for statically analysis, and/or to produce the indication extrapolated indication associated with the subsequent event. It should be appreciated that, by limiting input data considered by the indication program 304 to data indicative of the determined variable(s) for the subsequent event, the fidelity of the extrapolated indication may be retained or even improved while realizing increased efficiency via the selection of data most useful for generating the extrapolated indication. Additionally or alternatively, embodiments of the system 300 or components thereof (such as the determination program 306) may generate determined values associated with the determined variables that separate ranges of values of the determined variables (e.g., based on the strong interpolated correlations within the determination data 302).

Referring still to the exemplary embodiment of FIG. 2, one element or step implemented by the variable determination program 306 may be to receive the determination data 302 indicative of the previous events. The determination data 302 may be represented or included in a single file, database, spreadsheet or the like; or the determination data 302 may be represented by multiple such sources. Thus, receiving the determination data 302 may include receiving multiple files including or consisting of data associated with one or more previous events and/or indications associated with the respective previous events. For instance, one or more of the indications may be included in a separate file (or multiple separate files) communicated to and/or received by the variable determination program 306.

The determination program 306 may include or be associated with an instruction to utilize a multiple variable statistical algorithm and the determination data 306 to identify two or more data brackets (e.g., variables represented by or indicated by the determination data 306). Each data bracket (e.g., the data thereof) may define an interpolated correlation with the indications of the previous events. As used herein, a data bracket defining the interpolated correlation with an indication(s) of the previous event means that the data bracket includes or is associated with data having at least some or a minimal value for use in generating the extrapolated indication associated with the subsequent event. However, one or more of the data brackets may provide a higher value and/or define stronger interpolated correlations with the indications of the previous events, e.g., a determined variable.

For example and as illustrated in FIG. 2, the determination data 302 may generally include a number of data points (e.g., circles within the schematic box 302 representing one or more data points). Particularly, the value may be unknown for some of the data, such as all of the data, for determining the appropriate variables to produce the extrapolated indication of a subsequent event. Thus, the circles of the determination data 302 depicted in white represent data and associated data brackets, variables, or the like having unknown interpreted correlations with the indications of the previous events. It should be appreciated that an extrapolated indication associated with the subsequent event generated utilizing input data representative or indicative a data bracket not indicative of the determined variable(s) is generally associated with infidelity in the extrapolated indication generated, unnecessary or undesirable redundancy, increased computational time, or any combination of the preceding.

By identify the data brackets that define an interpolated correlation with indications of the previous events, the determined variable(s) may be identified from the same via further processing steps implemented by the determination program 306, as explained below. As illustrated in phantom in FIG. 2 (e.g., identified determination data 310), the determination program 306 may identify data brackets that define interpolated correlations with the indications of the previous events. For instance, the identified determination data 310 may indicate data brackets that define interpolated correlations with the indications of the previous events (e.g., solid depicted circles 312, crosshatched depicted circles 314, and vertically striped depicted circles 316) relative to data brackets defining no value, negligible value, and/or irrelevant for generating the indication with respect to the subsequent event (e.g., dashed depicted circles 318).

In various embodiments, determination program 306 may utilize an AI program(s), include one or more subprograms, and/or be associated with instructions that, when implemented, identify variables (e.g., data brackets included or indicated by the determination data 302) that each have more than the minimal value for use in generating an extrapolated indication associated with a subsequent event. Suitable AI programs for use in association with the determination program 306 to identify the data brackets having at least the minimum value for generating the extrapolated indication (e.g., solid data 312, crosshatched data 314, and/or striped data 316) may include or implement one or more multiple variable statistical algorithms, logistic regression algorithms, and/or other AI programs capable of identifying or establishing some or all of the data brackets having interpolated correlations with the previous events (e.g., solid data 312, crosshatched data 314, and/or striped data 316), as described herein.

Furthermore and in some embodiments, the determination program 306 may implement instructions to establishing some or all of the data brackets and/or sort the data thereof into the appropriate data bracket. In one example, the determination data 306 may include data indicative of the total debts of the users associated with the previous events and data indicative of the total deposit balance of the users associated with the previous event, e.g., for a specified time period before the previous event; and the determination program 306 may implement steps to generate a data bracket indicating a debt coverage ratio of the users associated with the previous events. Furthermore and in some instances, the debt coverage ratio may have more than the minimal value for use in generating the extrapolated indication associated with the subsequent event (e.g., defines the interpolated correlation with the indications of the previous events and/or defines an interpolated correlation over a minimum threshold with the indications of the previous events). Furthermore or in other examples, a data bracket indicative of the total debts of the users associated with the previous events and/or a data bracket indicative of the total deposit balances of the users associated with the previous events may be irrelevant for generating the indication with respect to the subsequent event (e.g., included symbolically within dashed depicted data 318).

Furthermore and in some embodiments, the determination program 306 may implement instructions to sort some or all of the determination data 302 into the appropriate data brackets. In the exemplary embodiment of FIG. 2, data indicative of the data bracket(s) is depicted in an organized structure (e.g., rows or columns of data as shown in phantom within the identified determination data 310). However, the determination program 306 may be equally suitable or capable of receiving unsorted, unlabeled, and/or other forms of raw data indicative of previous events and sorting such data into the appropriate data bracket, such as by implementing one or more suitable AI programs For several embodiments, the determination program 306 may include or be associated with an instruction to utilize bivariate analysis and the data brackets to identify the determined variable(s) (e.g., variable(s) represented or indicated by the determination data 302 defining strong interpolated correlation(s) with indications of the previous events). As used herein, a determined variable defining the strong interpolated correlation with the previous events means that the variable (and/or data indicative of such variable within the determination data 302) has at least a sufficient value for use in generating the extrapolated indication associated with the subsequent event that has increased fidelity, reduced redundancy, and/or realizes increased efficiency. In some embodiments, one or more of the determined variables may provide the even higher value and/or define even stronger interpolated correlations with the indications of the previous events, relative to other determined variables and when there are multiple determined variables. For example and as illustrated in FIG. 2, the determination data 302 may include data indicative of the determined variable having the highest value for use in generating the extrapolated indication associated with the subsequent event (e.g., first determined variable 320 depicted by a solid triangle in the determination output 308 and/or solid data 312 in the identified determination data 310). However and in some situations, only the first determined variable 320 may have sufficient value for use in generating the extrapolated indication associated with the subsequent event that has increased fidelity, reduced redundancy, and/or realizes increased efficiency.

In some situations, the determination data 302 may be indicative of multiple determined variables that define strong interpolated correlations, respectively, with indications of the previous events while providing less value than data indicative of the first determined variable 320. For example, the determination data 302 may include data indicative of a determined variable having a strong value but less value than the first determined variable 320 (e.g., a second determined variable 322 depicted by a crosshatched triangle in the determination output 308 and/or crosshatched data 314 in the identified determination data 310). In some instances the determination data 302 may include data indicative of a determined variable having a strong value but less value than both the first determined variable 320 and the second determined variable (e.g., a third determined variable 324 depicted by a vertically striped triangle in the determination output 308 and/or striped data 316 in the identified determination data 310).

In various embodiments, determination program 306 may utilize an AI program(s), include one or more subprograms, and/or be associated with instructions that, when implemented, identify the determined variable(s), each having sufficient value for use in generating the extrapolated indication associated with the subsequent event that has increased fidelity, reduced redundancy, and/or realizes increased efficiency. Suitable AI programs for use in association with the determination program 306 to identify the determined variable(s) having sufficient value for generating the extrapolated indication may include or implement one or more of bivariate analysis, decision tree analysis, and/or other AI programs capable of identifying or establishing some or all of the determined variables that define strong interpolated correlation(s) with indications of the previous events (e.g., first determined variable 320, second determined variable 322, and/or third determined variable 324).

It should be appreciated that determined variable(s) may have the most use for future processing, e.g., provide increased fidelity, reduced redundancy, and/or a reduction in the time required and/or computational power necessarily associated with running the indication program 304 to generate the extrapolated indication. In some instances, the first determined variable 320 may be indicative of the debt coverage ratio of the users associated with previous events. In some additional or alternative situations, the second determined variable 322 may be indicative of a cash flow velocities or a percentile changes in the deposited balances of the users associated with the previous events. In some instances, the third determined variable 324 may be indicative of a cash flow velocities or the percentile changes in the deposited balances of the users associated with the previous events. For example, the second determined variable 322 may indicate one of the cash flow velocities or the percentile changes in the deposited balances of the users associated with the previous events, and the third determined variable 324 may indicate the other.

In an additional or alternative embodiments of the system 300, the determination program 306 may include or be associated with an instruction to utilize bivariate analysis and the data brackets to generate the determined value for each of the determined variables (a value of the associated determined variable that separates ranges of data associated with the determined variable based on the strong interpolated correlation within the determination data 302). As used herein, a determined value that separates ranges of data of the determined variable based on the strong interpolated correlation with the previous events means that the value separates ranges of the of the associated determined variable (and/or data indicative of such variable within the determination data 302) indicating levels of completion of the previous events such that use of the determined value of the associated determined variable to generate the extrapolated indication associated with the subsequent event results in increased fidelity, reduced redundancy, and/or increased efficiency. For instance, values of the associated determined variable above (or alternatively below) the determined value (as indicated by the associated data bracket and/or the associated data of the determination data 302) may indicate or be associated with ideal or desirable indications for the associated previous events. For example and as illustrated in FIG. 2, the determination output 308 may include or indicate a first determined value 326 that separates values of the first determined variable 320 associated with ideal or desirable indications of the associated previous events. Generally, the determination program 306 may identify a first determined value 326 for each of the determined variables identified.

The determination program 306 may include or be associated with an instruction to utilize bivariate analysis and the data brackets to generate a second determined value for the associated determined variable (a second value of the associated determined variable that separates ranges of data associated with the determined variable based on the strong interpolated correlation within the determination data 302). The second value may generally indicate another level of completion of the previous events such that use of the second determined value of the associated determined variable to generate the extrapolated indication associated with the subsequent event results in increased fidelity, reduced redundancy, and/or increased efficiency. In one example, values of the associated determined variable between the determined value and the second determined value (as indicated by the associated data bracket and/or the associated data of the determination data 302) may indicate or be associated with acceptable but not ideal indications for the associated previous events or an acceptable portion of such indications associated with ideal indications. For example and as illustrated in FIG. 2, the determination output 308 may include or indicate a second determined value 328 that separates values of the first determined variable 320 associated with acceptable indications of the respective previous events or an acceptable portion of such indications associated with ideal indications. In some instances, values of the determined variable below (or alternatively above) both the first determined value 326 and the second determined value 328 may be associated with unacceptable indications of the respective previous events or an unacceptable portion of such indications associated with ideal indications. Similarly or alternatively, the determination program 306 may be configured to generate a second determined value for the second determined variable 322, the third determined variable 324, and/or any one or more further identified variables. For example and as depicted in the determined output 308 of FIG. 2, the determination program 306 may be configured to implement instructions to identify a first determined value 326 and a second determined value 328 for each of the first, second, and third determined variables 320, 322, 324.

In various embodiments, determination program 306 may utilize an AI program(s), include one or more subprograms, and/or be associated with instructions that, when implemented, generate the determined value(s) for each of the determined variables that, when utilized by the indication program 304, generate the extrapolated indication associated with the subsequent event that has increased fidelity, reduced redundancy, and/or increased efficiency. Suitable AI programs for use in association with the determination program 306 to generate the determined values may include or implement one or more of bivariate analysis, decision tree analysis, and/or other AI programs capable of generating some or all of the determined values that separate ranges of data of the determined variables based on the strong interpolated correlations with the previous events (e.g., first determined value 326 and/or second determined value 328 for any of determined variables 320, 322, 324).

The determination program 306 may include or be associated with an instruction to produce a representation of the determined variable(s) and the determined value(s) for use by the indication program 304. For example, the determination 306 may implement instructions to produce a visual representation (e.g., a graphical representation, command line output, or the like) of the of the determined variable(s) and determined value(s) for an operator of the system to communicate to the identification program 304. In additional or alternative embodiments, the determination 306 may implement instructions to produce determined output 308 including or indicative of the determined variable(s) and the determined value(s). In additional or alternative embodiments, the determination 306 may implement instructions to communicate the determined variable(s) and the determined value(s) to the indication program 304, which may be stored in a memory device included or associated with the system 300, determination program 306, and/or the indication program 304.

Aspects of the present subject matter are directed to a system for generating the extrapolated indication associated with a subsequent event. For example, the indication program 304 may utilize the determined variable(s) and determined value(s) communicated from the determination program 306 to generate an inference with respect to the subsequent event. The indication program is generally configured to perform steps in association with generating the extrapolated indication (e.g., the inference).

Referring still to the exemplary embodiment of FIG. 2, one element or step implemented by the indication program 304 may be to receive the determined variable(s) identified by the determination program 306 and each determined value generated by the determination program 306. As depicted and for example, the indication program 304 may directly receive a signal representative of or indicative of such parameters from the determination program 306, may receive the determination output 308 representative or indicative of such parameters, and/or an operator of the system 300 may manually communicate, input, or the like, the determined variable(s) and determined values communicated to the operator after implementation of the determination program 306. It should be appreciated that the determination output 308 and/or operator communicated parameters may be utilized in the generation of multiple, future extrapolated indications associated with multiple future events.

The indication program 304 may include or be associated with an instruction to receive the input data 303 representative of the subsequent event. Generally, the input data 303 includes data indicative of one or more of the determined variables, such as all of the determined variables, for the subsequent event. Furthermore and in some embodiments, the indication program 304 may implement instructions to generate the extrapolated indication associated with the subsequent event utilizing the input data, the determined variable(s), and each determined value. As described herein, the extrapolated indication associated with the subsequent event generated utilizing the determined variable(s) and each associated determined value has increased fidelity, reduced redundancy, or both relative to an extrapolated indication associated with the subsequent event generated utilizing input data of a data bracket not indicative of the determined variable(s) for the subsequent event. In some embodiments, the indication program 304 may include or be associated with an instruction to communicate a representation of the extrapolated indication associated with the subsequent event. For example, the indication program may generate a representation of the indication to the operator of the system 300 and/or generate an output file representative of or indicative of the indication associated with the subsequent event.

Referring now to FIG. 3 and some embodiments, an integrated module 402 may include a front-end algorithm 404 and a back-end algorithm 406. The integrated module 402 may be implemented on an AI processor 420, such as the processing device 120, the processing device 220, and/or a dedicated processing device. The instructions associated with the front-end algorithm 404 and the back-end algorithm 406 may be stored in an associated memory device and/or storage device of the system (e.g., memory device 124 and/or memory device 224) communicatively coupled to the AI processor 420, as shown. Additionally or alternatively, the system may include one or more memory devices and/or storage devices (represented by memory 424 in FIG. 5) for processing use and/or including one or more instructions necessary for operation of the integrated module 402. In some embodiments, the integrated module 402 may include a front-end algorithm 404 including or configured as the determination program 306. Additionally or alternatively, the integrated module 402 may include a back-end module 406 including or configured as the indication program 304.

Additionally or alternatively, the front-end program 404 can include one or more AI algorithms configured to utilize a multiple variable statistical algorithm, logistic regression, bivariate analysis, decision tree analysis, and/or other AI algorithms as described herein. In some embodiments, the integrated module 402 may be accelerated via an AI framework 422 (e.g., hardware). The AI framework 422 may include an index of basic operations, subroutines, and the like (primitives) typically implemented by AI and/or machine learning algorithms. Thus, the integrated module 402 may be configured to utilize the primitives of the framework 422 to perform some or all of the calculations required by the integrated module 402, the front-end program 404, and/or the determination program 306.

Referring now also to FIG. 2 and in some embodiments, a system to generate the extrapolated indication of the subsequent event may be included in a two-part module. For instance, a front-end program 404 may implement instructions to identify the determined variable(s) and the determined values, as described herein. Additionally or alternatively, the backend program 406 may implement instructions to generate the extrapolated indication from the determined variable(s), determined values, and the input data 303 indicative of the determined variable(s) for the subsequent event. Thus, the extrapolated indication associated with the subsequent event generated utilizing the integrated module 402 (e.g., from the determined variable(s) and each associated determined value) has increased fidelity, reduced redundancy, or both relative to an extrapolated indication associated with the subsequent event generated utilizing input data of a data bracket not indicative of the determined variable(s) for the subsequent event.

Referring now to FIG. 4, an exemplary embodiment of a method 500 is illustrated for generating a determined variable and associated value suitable for generating an extrapolated indication associated with a subsequent event. Utilization of the determined value of one or more determined variable (via method 500) to generate the extrapolated indication associated with the subsequent event rather than data of a data bracket not indicating the determined variable(s) increases the fidelity of the extrapolated indication, reduces redundancy within the extrapolated indication, or both.

As shown in element 502, the method 500 may include receiving data indicative of the previous events associated with the users (e.g., determination data 302). At element 504, the method 500 may include identifying, utilizing a multiple variable statistical algorithm and the determination data 302, the data brackets, each having interpolated correlation with indications of the previous events. For example, logistic regression may be utilized to identify the data brackets. The method 500 may further include identifying, utilizing bivariate analysis and the data brackets, the determined variable(s) that define the strong interpolated correlation with indications of the previous events (see method element 506). In some embodiments, decision tree analysis may be utilized to identity the determined variable(s). As shown in element 508, the method 500 may further include generating, utilizing bivariate analysis and the data brackets, a determined value for each of the determined variable(s) that separates ranges of data associated with the determined variable(s) based the strong interpolated correlation within the determination data. In some embodiments, decision tree analysis may be utilized to generate the determined value for each of the determined variable(s).

Additionally or alternatively, the method 500 may be suitable to generate the extrapolated indication associated with the subsequent event. In some embodiments, the method 500 includes receiving a representation of the determined variable(s) and each determined value. For example, the indication program 304 may directly receive such parameters from the determination program 306, from an associated determination output 308, and/or from an operator and based out the output of the determination program 306. The method 500 may include receiving input data including data associated with the subsequent event and indicative of the determined variable(s) for the subsequent event (e.g., input data 303). Additionally or alternatively, the method 500 may include generating the extrapolated indication associated with the subsequent event utilizing the input data, the determined variable(s), and the determined value.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A method for generating an extrapolated indication associated with a subsequent event executed by an integrated module comprising an AI processor accelerated by an AI framework, the integrated modules comprising a front-end determination program and a back-end indication program, the method comprising:

identifying, by a front-end determination program and via a multiple variable statistical algorithm and determination data indicative of a plurality of previous events associated with a plurality of users, a plurality of data brackets;

identifying, by the front-end determination program and via bivariate analysis and the plurality of data brackets, at least one determined variable correlated with indications of the plurality of previous events;

generating, by the front-end determination program via bivariate analysis and the plurality of data brackets, a determined value for each of the at least one determined variable. each determined value separating ranges of data of the associated determined variable;

receiving, at the back-end indication program, a determination output file generated by the front-end determination program, the determination output file comprising a representation of at least one determined variable and a determined value for each of the at least one determined variable;

receiving, at the computing station, input data including data associated with the subsequent event and indicative of the at least one determined variable for the subsequent event;

generating, by the back-end indication program, the extrapolated indication associated with the subsequent event, the generating including utilizing a portion of the input data indicative of the at least one determined variable, together with the at least one determined variable, and the determined value for each determined variable, wherein generating the extrapolated indication associated with the subsequent event utilizing only the portion of input data indicative of the at least one determined variable and each associated determined value increases fidelity of the extrapolated indication and reduces redundancy within the extrapolated indication relative to an extrapolated indication generated utilizing input data of a data bracket not indicating the at least one determined variable for the subsequent event.

2. The method of claim 1, wherein logistic regression is utilized to identify the plurality of data brackets each correlated with indications of the plurality of previous events.

3. A method for generating an extrapolated indication associated with a subsequent event executed by an integrated module comprising an AI processor accelerated by an AI framework, the integrated module comprising a front-end determination program and a back-end indication program, the method comprising:

receiving, by the back-end indication program of the integrated module at a computing station, input data including data associated with the subsequent event and indicative of at least one determined variable for the subsequent event, wherein the at least one determined variable is strongly correlated with indications of a plurality of previous events and is identified utilizing bivariate analysis and a plurality of data brackets, each data bracket of the plurality of data brackets correlated with indications of the plurality of previous events and identified utilizing a multiple variable statistical algorithm and determination data indicative of the plurality of previous events associated with a plurality of users;

generating, by the back-end indication program of the integrated module, the extrapolated indication associated with the subsequent event, the generating including utilizing only a portion of the input data that is indicative of the at least one determined variable, together with the at least one determined variable and a determined value for each determined variable of the at least one determined variable, wherein the determined value for each determined variable separates ranges of data of the associated determined variable, which is strongly correlated with indications of the plurality of previous events within the determination data and is generated utilizing bivariate analysis and the plurality of data brackets;

wherein generating the extrapolated indication associated with the subsequent event utilizing only the portion of the input data indicative of the at least one determined variable and each associated determined value increases fidelity of the extrapolated indication and reduces redundancy within the extrapolated indication relative to an extrapolated indication generated utilizing input data of a data bracket not indicating the at least one determined variable for the subsequent event, and thereby reduces a number of computations performed by the AI processor, reducing processing time and computing power consumption and increasing available processing resources for other computer readable instructions.

4. The method of claim 3, further comprising:

receiving, at the computing station, a determination file including a representation of the at least one determined variable and each associated determined value.

5. The method of claim 3, wherein logistic regression is utilized to identify the plurality of data brackets each correlated with indications of the plurality of previous events.

6. The method of claim 3, wherein decision tree analysis is utilized to identify the at least one determined variable strongly correlated with indications of the plurality of previous events.

7. The method of claim 3, wherein decision tree analysis is utilized to generate the determined value for each of the at least one determined variable that separates ranges of data associated with the at least one determined variable.

8. The method of claim 3, where the determined value for each of the at least one determined variable defines a first range of values of data of the associated determined variable indicative of a first level of completion of the plurality of previous events and a second range of values of data of the associated determined variable indicative of a second level of completion of the previous events.

9. The method of claim 3, wherein generating the extrapolated indication associated with the subsequent event further utilizes a second determined value of the at least one determined variable, wherein the second determined value separates ranges of data associated with the at least one determined variable based on the strong internal correlation within the determination data.

10. The method of claim 9, wherein the second determined value and the determined value of an associated determined variable define a first range, second range, and a third range of values of data of the associated determined variable, and wherein the first range of values of data is indicative of a first level of completion of the plurality of previous events, the second range of values of data is indicative of a second level of completion of the plurality of previous events, and the third range of values of data is indicative of a third level of completion of the plurality of previous events.

11. The method of claim 3, wherein generating the extrapolated indication associated with the subsequent event further utilizes a second determined value for each determined variable of the at least one determined variable, wherein each second determined value and the associated determined value define two ranges of data of the associated determined variable based on the strong internal correlation within the determination data.

12. The method of claim 3, wherein the at least one determined variable includes a first determined variable that defines a first strong internal correlation with indications of the plurality of previous events and a second determined variable that defines a second strong internal correlation with indications of the plurality of previous events.

13. The method of claim 12, wherein decision tree analysis is utilized to identify the first determined variable that defines the first strong internal correlation with indications of the plurality of previous events.

14. The method of claim 13, wherein decision tree analysis is utilized to identify the second determined variable that defines the second strong internal correlation with indications of the plurality of previous events.

15. The method of claim 14, wherein the first determined variable is indicative of a debt coverage ratio of the plurality of users associated with the plurality of previous events, and the second determined variable is indicative of at least one of a cash flow velocity or a percentile change in a deposited balance of the plurality of users associated with the plurality of previous events.

16. The method of claim 12, wherein the at least one determined variable further includes a third determined variable that defines a third strong internal correlation with indications of the plurality of previous events.

17. The method of claim 13, wherein decision tree analysis is utilized to identify the third determined variable that defines the third strong internal correlation with indications of the plurality of previous events.

18. The method of claim 17, wherein the first determined variable is indicative of a debt coverage ratio of the plurality of users associated with the plurality of previous events, and the second determined variable is indicative of at least one of a cash flow velocity or a percentile change in a deposited balance of the plurality of users associated with the plurality of previous events.

19. The method of claim 3, wherein the at least one determined variable is indicative of a debt coverage ratio of the plurality of users associated with the plurality of previous events.

20. The method of claim 3, further comprising:

communicating, utilizing the computing station, a representation of the extrapolated indication association with the subsequent event.

* * * * *